(12) United States Patent
Kadoda (10) Patent No.: US 8,614,805 B2
(45) Date of Patent: Dec. 24, 2013

(54) INFORMATION PROCESSING APPARATUS, INFORMATION PROCESSING SYSTEM, AND COMPUTER READABLE MEDIUM STORING PROGRAM

(75) Inventor: Akira Kadoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 362 days.

(21) Appl. No.: 13/112,830

(22) Filed: May 20, 2011

(65) Prior Publication Data

US 2012/0113456 A1 May 10, 2012

(30) Foreign Application Priority Data

Nov. 5, 2010 (JP) .................................. 2010-249015

(51) Int. Cl.
*G06K 15/00* (2006.01)
(52) U.S. Cl.
USPC ............ 358/1.14; 358/1.15; 358/1.16; 726/5; 726/10; 726/18
(58) Field of Classification Search
USPC ........ 358/1.14, 1.15, 1.16; 705/30; 726/5, 10, 726/18, 19, 26
See application file for complete search history.

(56) References Cited

U.S. PATENT DOCUMENTS

| 7,836,311 B2 * | 11/2010 | Kuriya et al. ................. 713/185 |
| 2002/0120861 A1 * | 8/2002 | Kagiwada et al. ............. 713/200 |
| 2005/0141024 A1 * | 6/2005 | Yoshihara et al. ............. 358/1.15 |
| 2011/0218892 A1 * | 9/2011 | Jeong et al. ..................... 705/30 |

FOREIGN PATENT DOCUMENTS

JP 2002-077484 A 3/2002

\* cited by examiner

*Primary Examiner* — Allen H Nguyen
(74) *Attorney, Agent, or Firm* — Sughrue Mion, PLLC (57) ABSTRACT

An information processing apparatus includes an accepting unit, a memory, a controller, and a switch unit. The accepting unit accepts an identifier and a storage site information item representing a storage site for storing a usage amount information item representing a usage amount. The memory stores one or more identifiers and plural storage site information items in association with each other. The controller performs, if the accepted identifier matches one of the stored identifiers and if the accepted storage site information item matches one of the stored storage site information items, control so that the usage amount information item is stored in the storage site represented by the storage site information item. The switch unit switches, if a different storage site information item is accepted when the storage site is a target, the storage site as the target to the storage site represented by the different storage site information item.

10 Claims, 11 Drawing Sheets

INFORMATION PROCESSING APPARATUS, INFORMATION PROCESSING SYSTEM, AND COMPUTER READABLE MEDIUM STORING PROGRAM

CROSS-REFERENCE TO RELATED APPLICATIONS

This application is based on and claims priority under 35 USC 119 from Japanese Patent Application No. 2010-249015 filed Nov. 5, 2010.

BACKGROUND (i) Technical Field

The present invention relates to an information processing apparatus, an information processing system, and a computer readable medium storing a program.

SUMMARY

According to an aspect of the invention, there is provided an information processing apparatus including: an accepting unit that accepts an identifier for identifying a user of a device and a storage site information item representing a storage site for storing a usage amount information item representing a usage amount concerning use of the device by the user; a memory that stores one or more identifiers and a plurality of storage site information items in association with each other; a controller that performs, if the identifier accepted by the accepting unit matches one of the identifiers stored in the memory and if the storage site information item accepted by the accepting unit matches one of the storage site information items stored in the memory, control so that the usage amount information item representing the usage amount concerning use of the device is stored in the storage site represented by the storage site information item; and a switch unit that switches, if a different storage site information item that is different from the storage site information item currently accepted by the accepting unit among the storage site information items stored in the memory is accepted by the accepting unit when the storage site represented by the storage site information item accepted by the accepting unit is set, in accordance with control performed by the controller, as a target in which the usage amount information item is to be stored, the storage site set as the target to the storage site represented by the different storage site information item.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the attached drawings.

Figure 1:
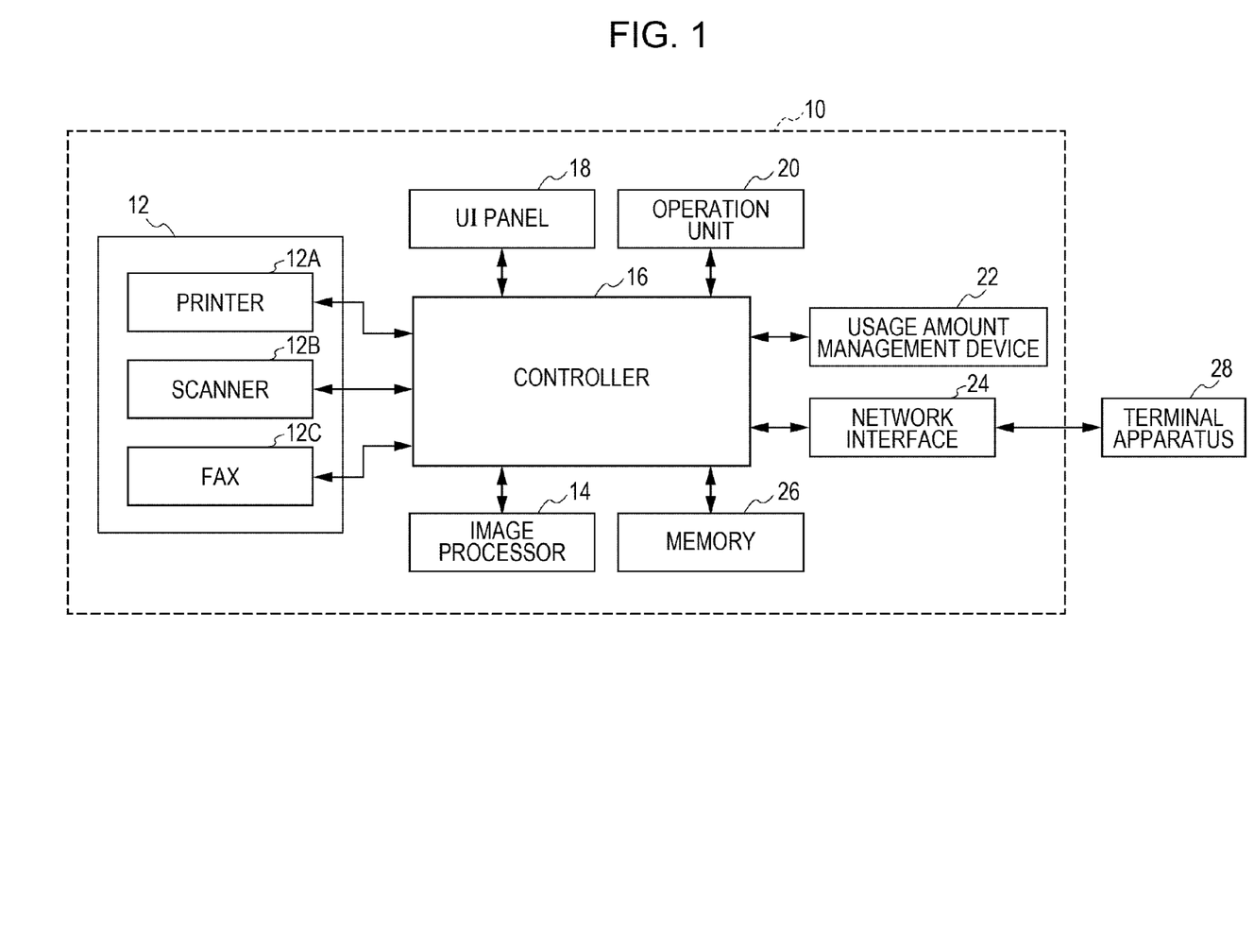
FIG. 1 is a block diagram illustrating an example configuration of an image processing output apparatus according to an exemplary embodiment of the present invention.

FIG. 1 is a schematic diagram illustrating an example configuration of an image processing output apparatus 10 according to the exemplary embodiment. As illustrated in FIG. 1, the image processing output apparatus 10 includes an image processing output unit 12, an image processor 14, a controller 16, a user interface (UI) panel 18, an operation unit 20, a usage amount management device 22, a network interface 24, and a memory 26.

The image processing output unit 12 receives image information representing an image, performs predetermined processing on the image information, and outputs the processed image information. Specifically, the image processing output unit 12 includes a printer 12A, a scanner 12B, and a facsimile machine (FAX) 12C.

The printer 12A forms an image represented by image information input thereto on recording paper serving as a recording medium. In this exemplary embodiment, a xerography printer is used as the printer 12A. Alternatively, an inkjet printer, a thermal printer, a dot impact printer, or the like may be used instead.

The scanner 12B scans a document using an image sensor, thereby obtaining image information. In this exemplary embodiment, a flathead scanner provided with an auto document feeder (ADF) is used as the scanner 12B. This is an image scanner based on a charge-coupled device (CCD) optical reduction scheme. Alternatively, a handy image scanner or a drum-type image scanner may be used instead. Furthermore, instead of the image scanner based on the CCD optical reduction scheme, an image scanner having an imaging device other than the CCD, such as an image scanner based on a contact image sensor (CIS) scheme, may be used.

The FAX 12C transmits image information read by the scanner 12B to an external communication apparatus (not illustrated) via a communication medium (e.g., public telephone network). Also, the FAX 12C receives image information transmitted from an external communication apparatus, and forms an image represented by the received image information on recording paper using the printer 12A.

The image processor 14 performs predetermined image processing on image information that is obtained through scanning performed by the scanner 12B or image information input from an external apparatus. Specifically, the image processor 14 performs image processing on the basis of image information, such as a color/temperature correction process, an image density conversion process, a hyper-tone process, a hyper-sharpness process, special image processing, and a magnification change process.

The controller 16 includes a computer having a central processing unit (CPU), a read only memory (ROM), and a random access memory (RAM). The CPU controls the entire image processing output apparatus 10 by executing processing of various programs. The ROM serves as a storage medium, in which a control program for controlling the operation of the image processing output apparatus 10, a function specification execution process program (described below), an account switch process program (described below), and various parameters are stored in advance. The RAM serves as a storage medium used as a work area or the like during execution of various programs.

The UI panel 18 is constituted by a touch panel display or the like in which a transmissive touch panel is superposed on a display. Various types of information is displayed on the display screen of the display. A user may input desired information or instructions by touching the touch panel. Specifically, for example, an instruction to start image formation by the printer 12A is provided, an instruction to start reading a document by the scanner 12B is provided, various settings of image processing performed on image information obtained by the scanner 12B are performed, and an instruction to start transmission/reception of image information by the FAX 12C is provided, using the UI panel 18.

The operation unit 20 includes a power switch, a numeric keypad, and buttons that are operated for providing various instructions to the image processing output apparatus 10 and performing various settings on the image processing output apparatus 10.

The usage amount management device 22 manages usage amount information representing a usage amount concerning the use of a function (device) provided in the image processing output apparatus 10. In the image processing output apparatus 10 according to this exemplary embodiment, any of the following functions is selected by a user: a scanner function of obtaining image information by scanning a document; an image formation function of forming an image based on image information input from an external apparatus (e.g., a terminal apparatus 28 described below) on paper; a copying function of forming an image based on image information obtained by the scanner function on paper; and a facsimile (fax) function of performing fax transmission/reception (hereinafter, these functions are collectively referred to as "image processing output functions"). When the user uses a selected function, a usage amount thereof is counted by the controller 16, and usage amount information representing the counted usage amount is stored in any of plural predetermined storage sites (storage areas) in the usage amount management device 22.

The network interface 24 is connected to a communication medium (e.g., local area network (LAN)), and transmits/receives various types of information to/from the terminal apparatus (e.g., personal computer) 28 via the communication medium.

The memory 26 is constituted by an auxiliary memory (e.g., hard disk device), and stores image information that is processed by the image processing output unit 12 and is to be output therefrom, and data used for performing various settings. Also, the memory 26 stores user IDs and account IDs in association with each other. The user IDs are assigned to users and serve as identifiers for uniquely identifying the users who use the image processing output apparatus 10. Each of the account IDs represents a storage site of usage amount information representing a usage amount concerning the use of an image processing output function, and also represents an account address to which an account generated by using an image processing output function is sent (an account address to which an account for usage fees of a function of the image processing output apparatus 10 is sent).

Figure 2:
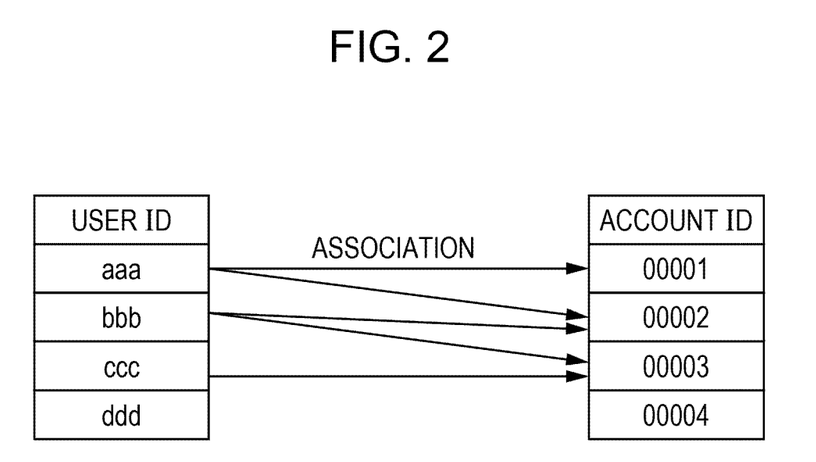
FIG. 2 is a schematic diagram illustrating an example of association between user IDs and account IDs stored in a memory of the image processing output apparatus according to the exemplary embodiment.

FIG. 2 is a schematic diagram illustrating an example of a state in which user IDs are associated with account IDs. As illustrated in FIG. 2, user IDs "aaa", "bbb", "ccc", and "ddd" of four users are stored in advance in the memory 26. Also, four account IDs "00001", 00002", "00003", and "00004" are stored in advance in the memory 26.

"aaa" is associated with "00001" and "00002". "bbb" is associated with "00002" and "00003". "ccc" is associated with "00003". "ddd" is not associated with any account ID. Furthermore, no user ID is associated with "00004", which means that this account ID is not used (currently used) concerning a function in which authentication of a user is necessary (this account ID may be used if the setting of the image processing output apparatus 10 is performed so that authentication of a user is not necessary and only an account ID is used).

The printer 12A, scanner 12B, FAX 12C, image processor 14, UI panel 18, operation unit 20, usage amount management device 22, network interface 24, and memory 26 are connected to the controller 16. Thus, the controller 16 performs access to the memory 26, acquisition of various types of information from the printer 12A, scanner 12B, FAX 12C, image processor 14, and usage amount management device 22, control of the operations of the printer 12A, scanner 12B, FAX 12C, image processor 14, and usage amount management device 22, display of various types of information on the UI panel 18, recognition of instructions provided by a user to the UI panel 18 and operation unit 20, and transmission/reception of various types of information to/from the terminal apparatus 28 via the network interface 24.

Now, a description will be given of an example of a case where image processing output functions of the image processing output apparatus 10 are used by a user in a method according to the related art. Here, in order to avoid complexity, a copying function and a fax function are used as image processing output functions.

Figure 3:
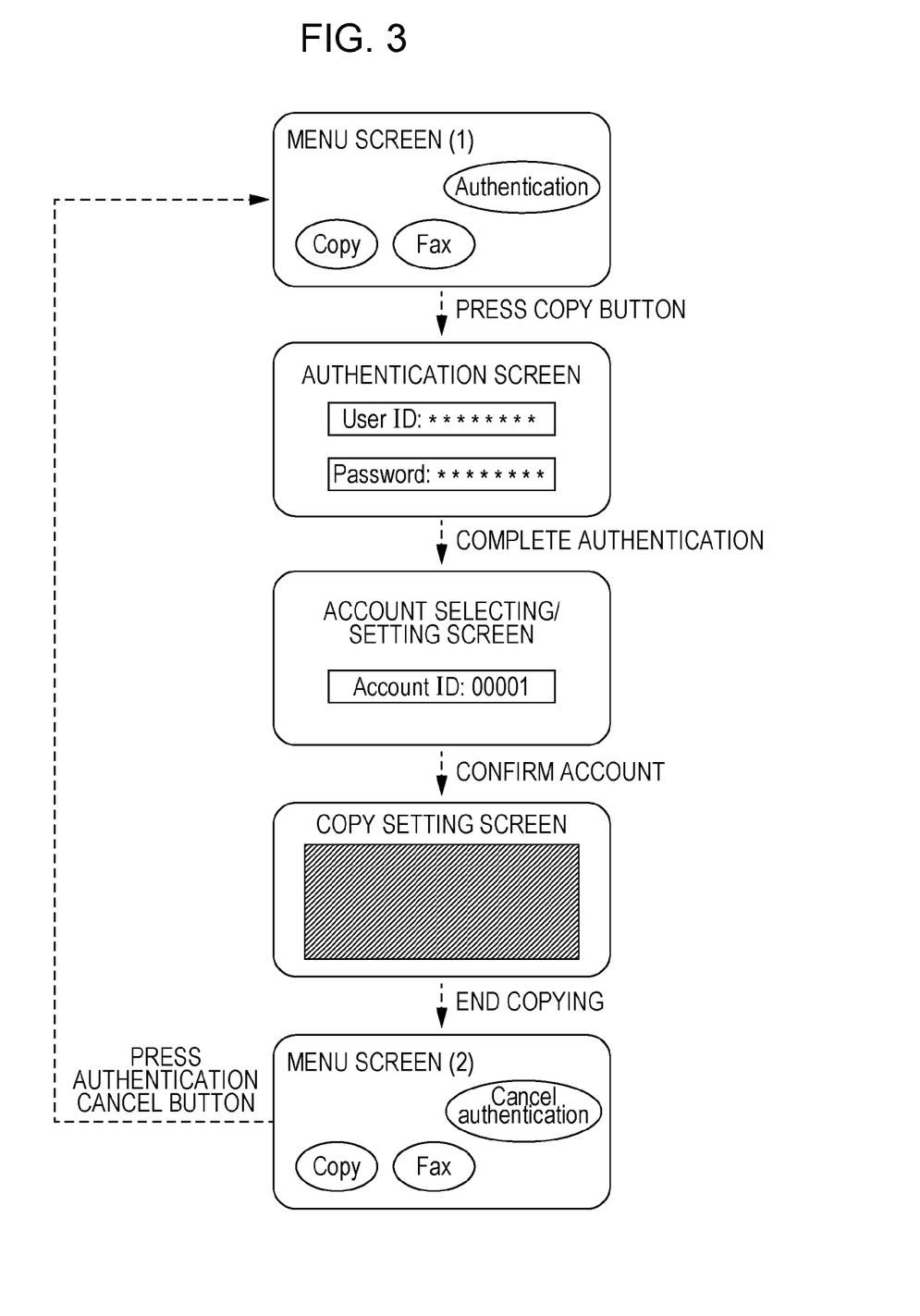
FIG. 3 is a diagram illustrating an example of a screen transition state in the case of operating the image processing output apparatus using a method according to a related art.

FIG. 3 illustrates an example of a transition state of the screen displayed on the UI panel 18. As illustrated in FIG. 3, in the case of using an image processing output function, a menu screen (1) is displayed first on the UI panel 18. In the example illustrated in FIG. 3, a copy button "Copy", a fax button "Fax", and an authentication button "Authentication" are displayed on the menu screen (1). The copy button is a button that is pressed to start the copying function. The fax button is a button that is pressed to start the fax function. The authentication button is a button for providing an instruction to perform a process in the procedure of authenticating a user and then allowing the user to select an image processing output function.

When the copy button is pressed by a user on the menu screen (1), the menu screen (1) changes to an authentication screen. On the authentication screen, a user ID input field for inputting a user ID and a password input field for inputting a password are displayed. A user ID and a password may be input to the user ID input field and the password input field by operating the operation unit 20. Alternatively, an alphabetic keyboard and a numeric keypad may be displayed on the UI panel 18, and a user ID and a password may be input using the alphabetic keyboard and numeric keypad. When a confirmation key (not illustrated) is pressed after a user ID has been input to the user ID input field and a password has been input to the password input field, authentication of the user is completed if the input user ID is a predetermined user ID and if the input password is a predetermined password. Then, the authentication screen changes to an account selecting/setting screen.

On the account selecting/setting screen, an account ID input field for inputting an account ID is displayed. An account ID may be input to the account ID input field by operating the numeric keypad of the operation unit 20. Alternatively, a numeric keypad may be displayed on the UI panel 18, and an account ID may be input using the numeric keypad. When a confirmation key (not illustrated) is pressed after an account ID has been input to the account ID input field, the account ID is confirmed if the input account ID is a predetermined account ID. Then, the account selecting/setting screen changes to a copy setting screen, and the copying function is started. After that, an account for usage fees is sent to the account address represented by the account ID as long as the account ID is not changed. If the account ID input to the account ID input field is not a predetermined account ID, the screen changes to the menu screen (1).

The copy setting screen is a screen for performing various settings before performing copying. Various setting keys, a copy start key for starting copying, and so forth are displayed in the hatched area in FIG. 3. When a user provides an instruction to start copying after performing various settings on the copy setting screen, copying is performed in accordance with the settings, and accounting for the copying is performed for the account address represented by the account ID that is currently set. After copying has ended, the copy setting screen changes to a menu screen (2).

The menu screen (2) is different from the menu screen (1) only in that an authentication cancel button is displayed instead of the authentication button. On the menu screen (2), the authentication cancel button "Cancel authentication" is displayed. The authentication cancel button is a button that is pressed to cancel the current authentication state. When a user presses the authentication cancel button, the current authentication state is canceled, and the menu screen (2) changes to the menu screen (1). Here, a state where the authentication state is canceled is a state where the user ID and password that are currently valid become invalid and where it is necessary for the user to input the user ID and password on the authentication screen if he/she wants to use the image processing output apparatus 10.

Figure 4:
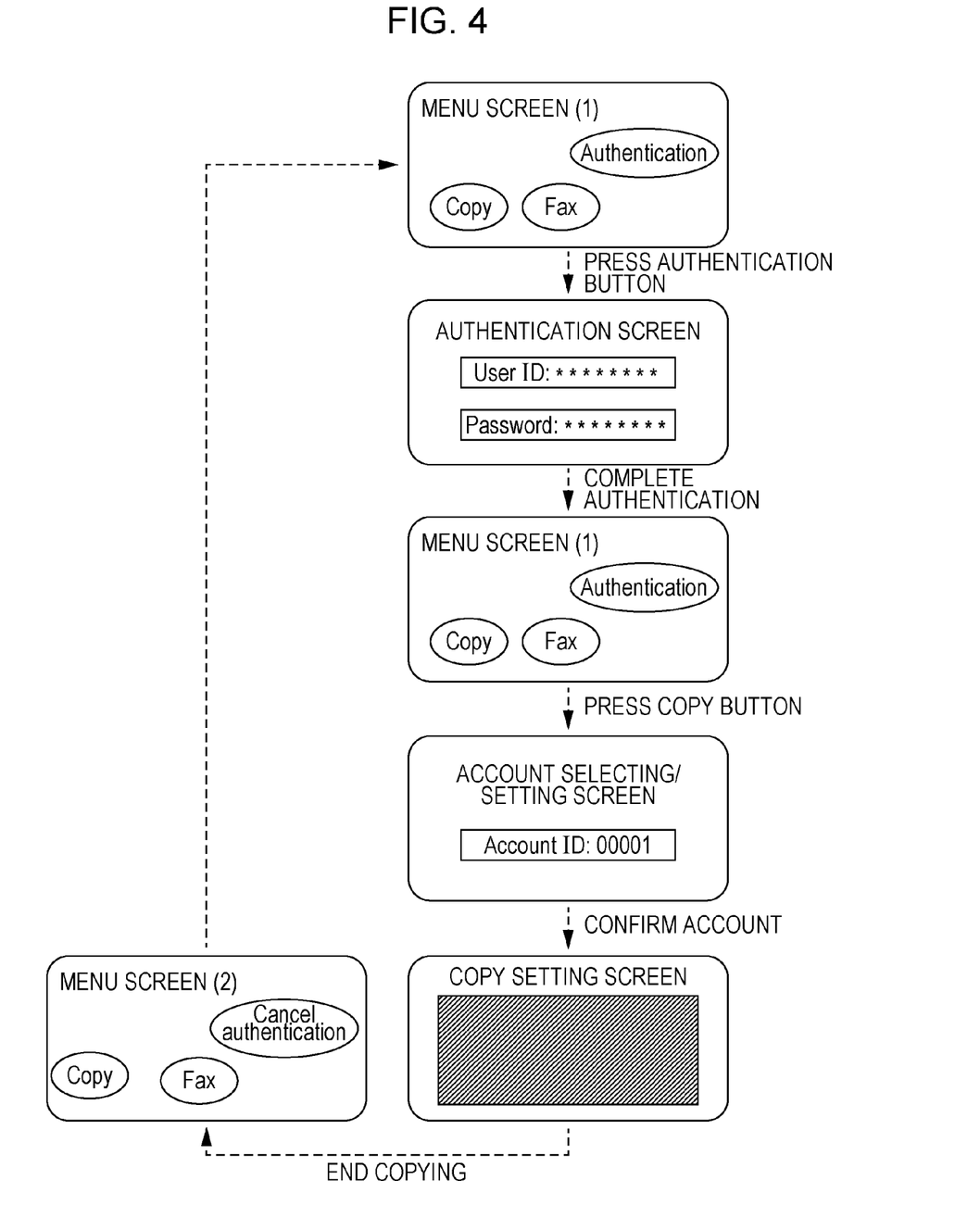
FIG. 4 is a diagram illustrating another example of the screen transition state in the case of operating the image processing output apparatus using the method according to the related art.

FIG. 4 illustrates another example of the transition state of the screen displayed on the UI panel 18. In a case where the menu screen (1) is displayed as illustrated in FIG. 4, when the authentication button is pressed by a user, the menu screen (1) changes to the authentication screen. When a confirmation key (not illustrated) is pressed after a user ID has been input to the user ID input field and a password has been input to the password input field, authentication of the user is completed if the input user ID is a predetermined user ID and if the input password is a predetermined password. Then, the authentication screen changes to the menu screen (1). When the copy button on the menu screen (1) is pressed by the user, the screen changes to the account selecting/setting screen. When a confirmation key (not illustrated) is pressed after an account ID has been input to the account ID input field, the account ID is confirmed if the input account ID is a predetermined account ID. Then, the account selecting/setting screen changes to the copy setting screen, copying is performed via the copy setting screen, and the copy setting screen changes to the menu screen (2). Then, when the authentication cancel button is pressed by the user, the current authentication state is canceled, and the menu screen (2) changes to the menu screen (1).

After a certain time period (e.g., ten minutes) has elapsed from when the account selecting/setting screen is displayed, a so-called time-out process is performed in which the authentication state is canceled and the screen changes to the authentication screen.

As described above, in the method according to the related art for using the image processing output apparatus 10, it is necessary to go back to the authentication screen (perform so-called "logout") and re-input the user ID and password for authentication (perform so-called "login") in order to change an account ID.

In contrast, in the image processing output apparatus 10 according to this exemplary embodiment, a function specification execution process is performed in order to change an account ID without the operation of once performing logout and then performing login again.

Figure 5:
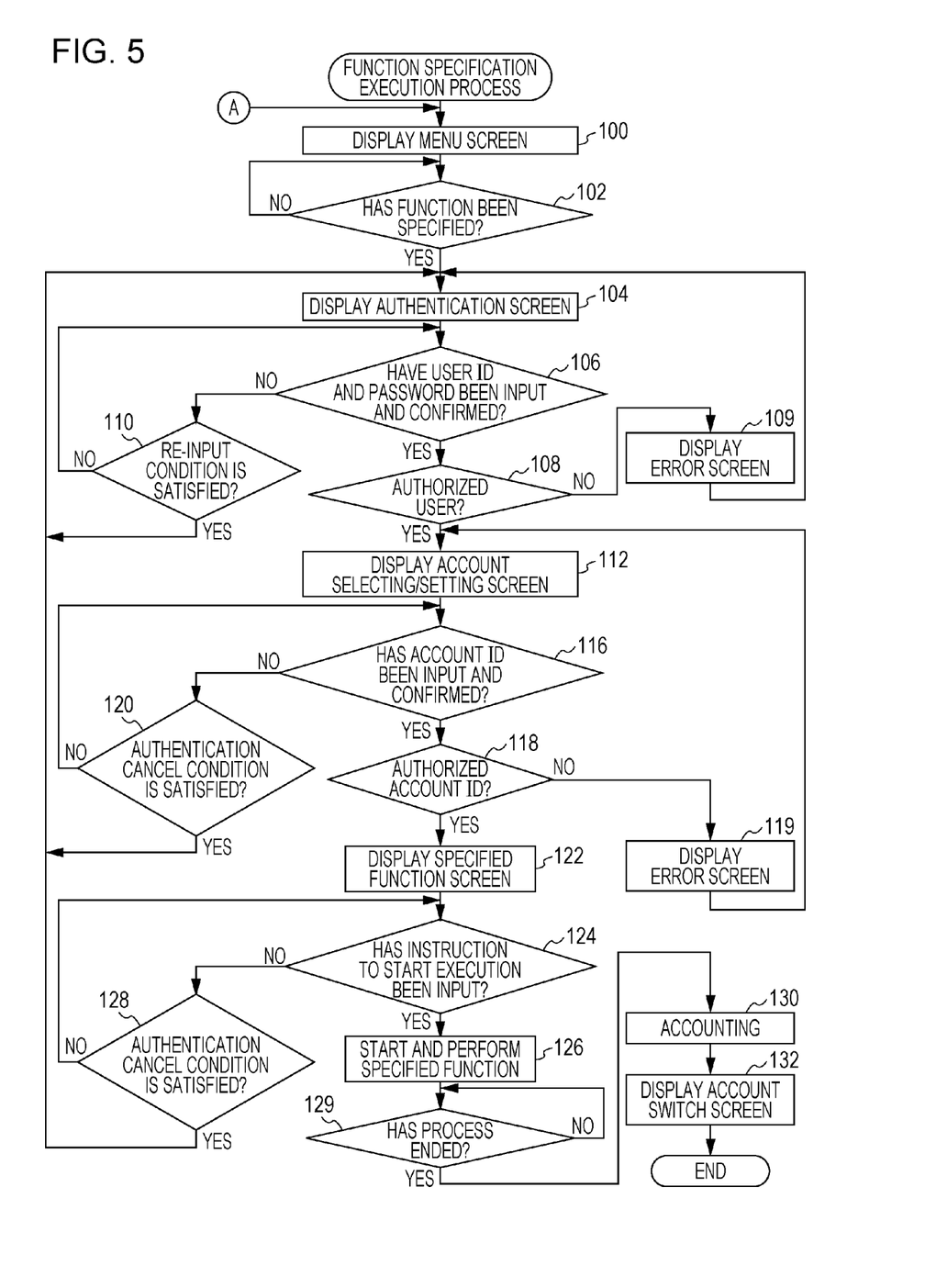
FIG. 5 is a flowchart illustrating the process of a function specification execution process program according to the exemplary embodiment.

Hereinafter, a description will be given of the operation of the image processing output apparatus 10 in the case of performing the function specification execution process with reference to FIG. 5. FIG. 5 is a flowchart illustrating the process of a function specification execution process program performed by the controller 16 when the power switch of the image processing output apparatus 10 is turned on.

Figure 6:
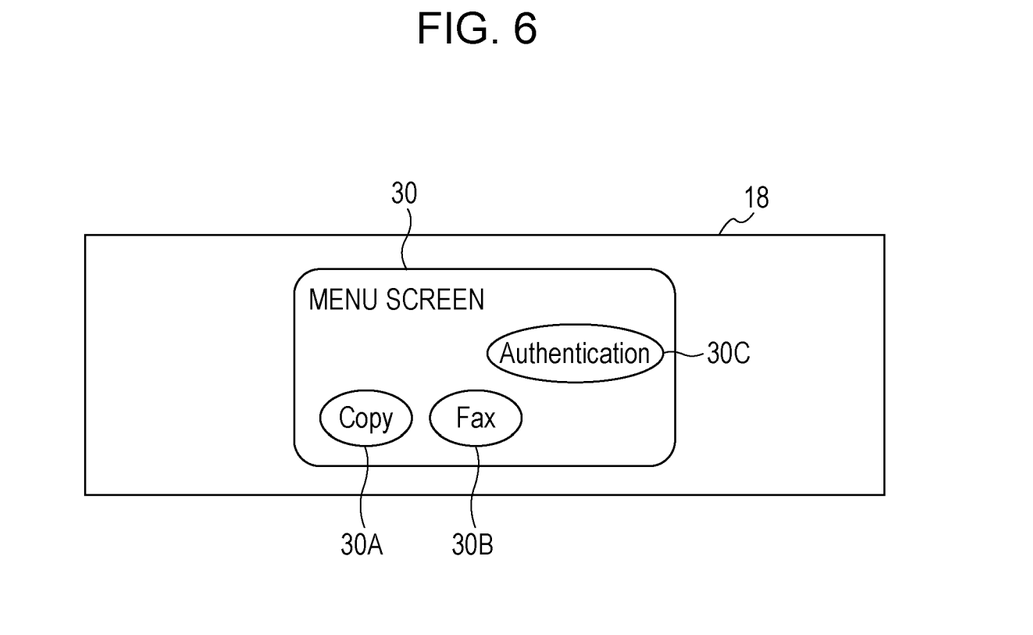
FIG. 6 is a schematic diagram illustrating an example of a menu screen displayed on a UI panel according to the exemplary embodiment.

Referring to FIG. 5, a menu screen 30 is displayed on the UI panel 18 (see FIG. 6) in step 100. Then, the process proceeds to step 102, where it is determined whether or not an image processing output function has been specified. FIG. 6 illustrates an example display of the menu screen 30. A copy button 30A "Copy", a fax button 30B "Fax", and an authentication button 30C "Authentication" are displayed on the menu screen 30. The copy button 30A is a button that is pressed to start the copying function. The fax button 30B is a button that is pressed to start the fax function. The authentication button 30C is a button that is pressed in the case of performing a process in the procedure of allowing a user to select an image processing output function after completing authentication of the user. When the copy button 30A or the fax button 30B is pressed by the user on the menu screen 30, a positive determination is made in step 102, and the process proceeds to step 104. Here, in order to avoid complexity, a description will be given of a case where the copy button 30A is pressed.

Figure 7:
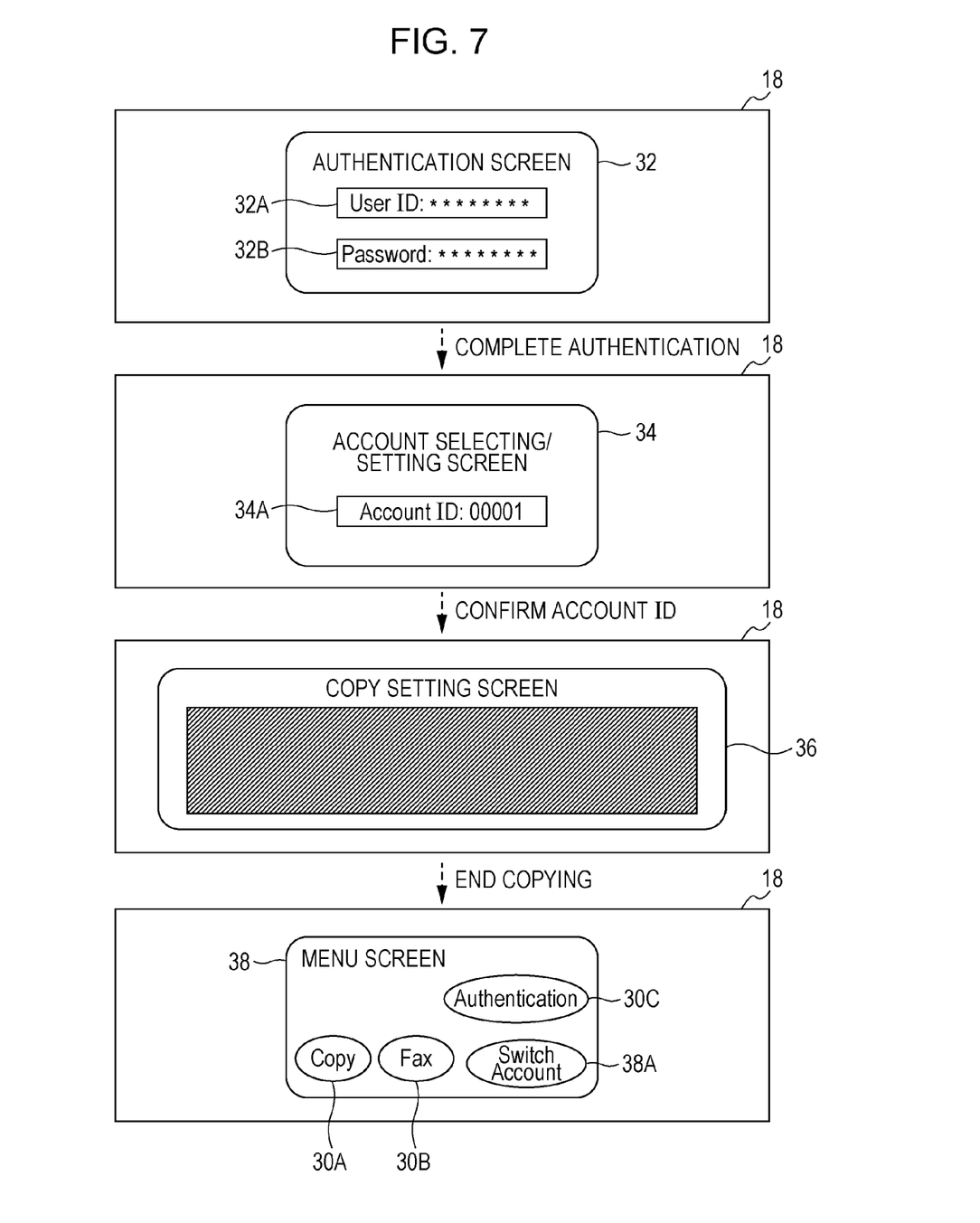
FIG. 7 is a diagram illustrating an example of a screen transition state on the UI panel when a function specification execution process according to the exemplary embodiment is being performed.

In step 104, the screen displayed on the UI panel 18 is changed from the menu screen 30 to an authentication screen 32 (see FIG. 7), and the process proceeds to step 106, where it is determined whether or not a user ID and a password have been input and confirmed. FIG. 7 illustrates an example display of the authentication screen 32. On the authentication screen 32, a user ID input field 32A for inputting a user ID and a password input field 32B for inputting a password are displayed such that the input portions thereof are blank. A user ID and a password may be input to the user ID input field 32A and the password input field 32B by operating the operation unit 20. Alternatively, an alphabetic keyboard and a numeric keypad may be displayed on the UI panel 18, and a user ID and a password may be input using the alphabetic keyboard and numeric keypad. On the authentication screen 32, a user ID is input to the user ID input field 32A and a password is input to the password input field 32B by the user, and the input user ID and password are confirmed by pressing a confirmation key (not illustrated). Accordingly, a positive determination is made in step 106 and the process proceeds to step 108. On the other hand, if a predetermined number of characters (here, eight characters) have not been input as a user ID or password in the user ID input field 32A or the password input field 32B, a negative determination is made in step 106 and the process proceeds to step 110. When alphabetic characters or numeric characters are input to the user ID input field 32A and the password input field 32B by operating the UI panel 18 or the operation unit 20, the input alphabetic characters or numeric characters are displayed as asterisks (*) one by one in the input portion thereof.

In step 110, the information that has been input to the user ID input field 32A and the password input field 32B so far is invalidated. If information has been input to the user ID input field 32A and the password input field 32B, the information is erased therefrom and it is determined whether or not a re-input condition for allowing the user to re-input the user ID and password is satisfied. If a negative determination is made, the process returns to step 106. If a positive determination is made, the process returns to step 104.

In step 108, it is determined whether or not the user ID and password that are input and confirmed in step 106 are of the user who is authorized to use the image processing output apparatus 10. If a positive determination is made, the process proceeds to step 112. If a negative determination is made, the process proceeds to step 109, where the screen displayed on the UI panel 18 is changed from the authentication screen 32 to an error screen (not illustrated) showing that the information that is input and confirmed in step 106 is wrong. The error screen is displayed for a predetermined time period (e.g., five seconds), and then the process returns to step 104. On the error screen displayed on the UI panel 18, a message "Input information is wrong." is displayed, for example.

In step 112, the screen displayed on the UI panel 18 is changed from the authentication screen 32 to the account selecting/setting screen 34 (see FIG. 7), and the process proceeds to step 116, where it is determined whether or not an account ID has been input and confirmed. On the account selecting/setting screen 34, for example, as illustrated in FIG. 7, an account ID input field 34A is displayed in which the portion where an account ID is to be input is blank. An account ID may be input to the account ID input field 34A by operating the numeric keypad of the operation unit 20. Alternatively, a keyboard and a numeric keypad may be displayed on the UI panel 18, and an account ID may be input by operating the keyboard and numeric keypad. FIG. 7 illustrates an example in which "00001" is input as an account ID in the account ID input field 34A. The user inputs an account ID to the account ID input field 34A on the account selecting/setting screen 34 and confirms the input account ID by pressing a confirmation key (not illustrated. Accordingly, a positive determination is made in step 116 and the process proceeds to step 118. On the other hand, if an account ID has not been input to the account ID input field 34A and the confirmation key has not been pressed, a negative determination is made and the process proceeds to step 120.

In step 120, it is determined whether or not an authentication cancel condition for canceling the current authentication state is satisfied (e.g., a condition in which a predetermined time period (five minutes) has elapsed from when the account selecting/setting screen 34 is displayed, or a condition in which information for providing an instruction to cancel the current authentication state has been received through operation of the UI panel 18 or the operation unit 20). If a negative determination is made, the process returns to step 116. If a positive determination is made, the process returns to step 104.

In step 118, it is determined whether or not the account ID that is input and confirmed in step 116 is an account ID representing the account address authorized in advance, that is, whether or not the account ID that is input and confirmed in step 116 is an account ID stored in the memory 26 in association with the user ID that is input and confirmed in step 106. If a negative determination is made, the process proceeds to step 119. If a positive determination is made, the process proceeds to step 122. In step 119, an error screen (not illustrated) showing that the information input and confirmed in step 116 is wrong is displayed. The error screen is displayed for a predetermined time period (e.g., five seconds), and then the process returns to step 112. On the error screen displayed on the UI panel 18, a message "Input information is wrong." is displayed, for example.

In step 122, the screen displayed on the UI panel 18 is changed from the account selecting/setting screen 34 to a specified function screen, which is a screen on which a necessary operation input is performed for starting the image processing output function specified in step 102 (here, "copy setting screen 36" (see FIG. 7), which is an operation input screen for starting the copying function), and the process proceeds to step 124. Note that the copy setting screen 36 is configured similarly to the copy setting screens illustrated in FIGS. 3 and 4.

In step 124, it is determined whether or not an instruction to start execution of copying has been input on the copy setting screen 36. If a positive determination is made, the process proceeds to step 126. On the other hand, if a negative determination is made, the process proceeds to step 128, where it is determined whether or not an authentication cancel condition for canceling the current authentication state is satisfied (e.g., a condition in which a predetermined time period (five minutes) has elapsed from when the copy setting screen 36 is displayed, or a condition in which information for providing an instruction to cancel the current authentication state has been received through operation of the UI panel 18 or the operation unit 20). If a negative determination is made, the process returns to step 124. If a positive determination is made, the process returns to step 104.

In step 126, the image processing output function (here, copying function) is started and copying is performed in accordance with the setting performed on the copy setting screen 36. Then, the process proceeds to step 129. In step 129, it is determined whether or not copying performed in step 126 has ended. If copying has ended, the process proceeds to step 130, where the usage amount management device 22 is controlled so that accounting is performed for the account address represented by the account ID that is input and confirmed in step 116 (so that usage amount information representing a usage amount is stored in the storage site represented by the account ID). In the image processing output apparatus 10 according to this exemplary embodiment, usage amount information is transmitted to the account address represented by the account ID that is input and confirmed in step 116. In this case, for example, assume that the terminal apparatus 28 is provided at the account address represented by the account ID. Then, the controller 16 obtains the usage amount information stored in the storage area corresponding to the account address from the usage amount management device 22, and transmits the obtained usage amount information to the terminal apparatus 28 via the network interface 24. The terminal apparatus 28 receives the usage amount information transmitted from the image processing output apparatus 10. Alternatively, account information representing an account may be transmitted to the account address represented by the account ID that is input and confirmed in step 116. In this case, for example, assume that the terminal apparatus 28 is provided at the account address represented by the account ID. Then, the controller 16 obtains the usage amount information stored in the storage area corresponding to the account address from the usage amount management device 22, calculates the value of the usage amount represented by the obtained usage amount information, and transmits account information representing the value obtained through the calculation to the terminal apparatus 28 via the network interface 24. The terminal apparatus 28 receives the account information transmitted from the image processing output apparatus 10. Accordingly, the amount charged is easily recognized in the terminal apparatus 28 at the account address.

In step 132, the screen displayed on the UI panel 18 is changed from the copy setting screen 36 to a menu screen 38 (hereinafter also referred to as account switch screen 38) for waiting for specification of an image processing output function or for an instruction to switch the account ID (see FIG. 7). Then, the function specification execution process program ends.

Note that the menu screen 38 illustrated in FIG. 7 is different from the menu screen 30 illustrated in FIG. 6 only in that an account switch button 38A "Switch Account" is newly provided. The account switch button 38A is a button that is pressed to switch the currently specified account ID to another account ID.

Figure 8:
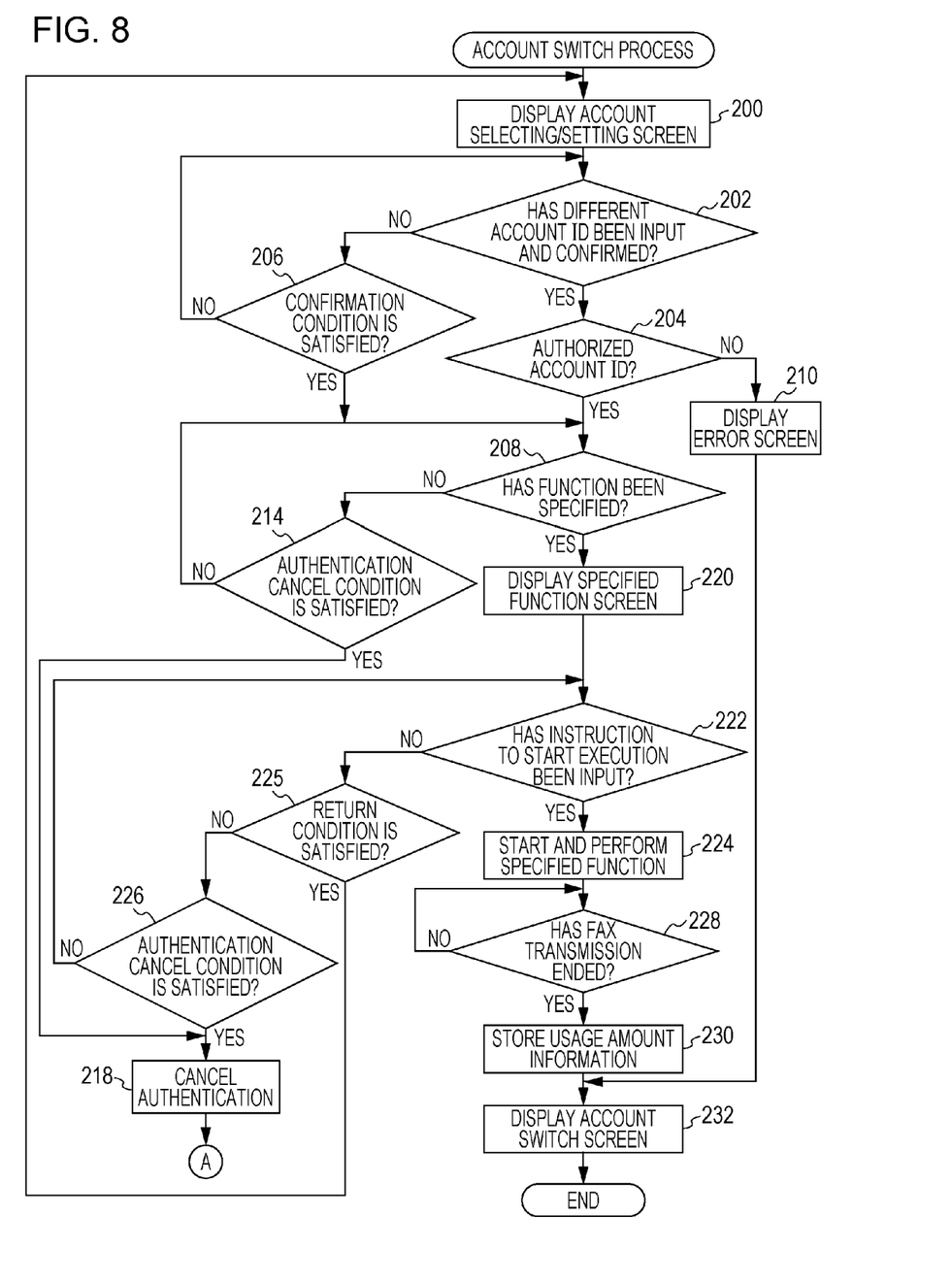
FIG. 8 is a flowchart illustrating an account switch process program according to the exemplary embodiment.

Next, a description will be given of an account switch process that is performed by the image processing output apparatus 10 when the account witch button 38A is pressed with reference to FIG. 8. FIG. 8 is a flowchart illustrating the process of an account switch process program that is performed by the controller 16 when the account switch button 38A is pressed.

Figure 9:
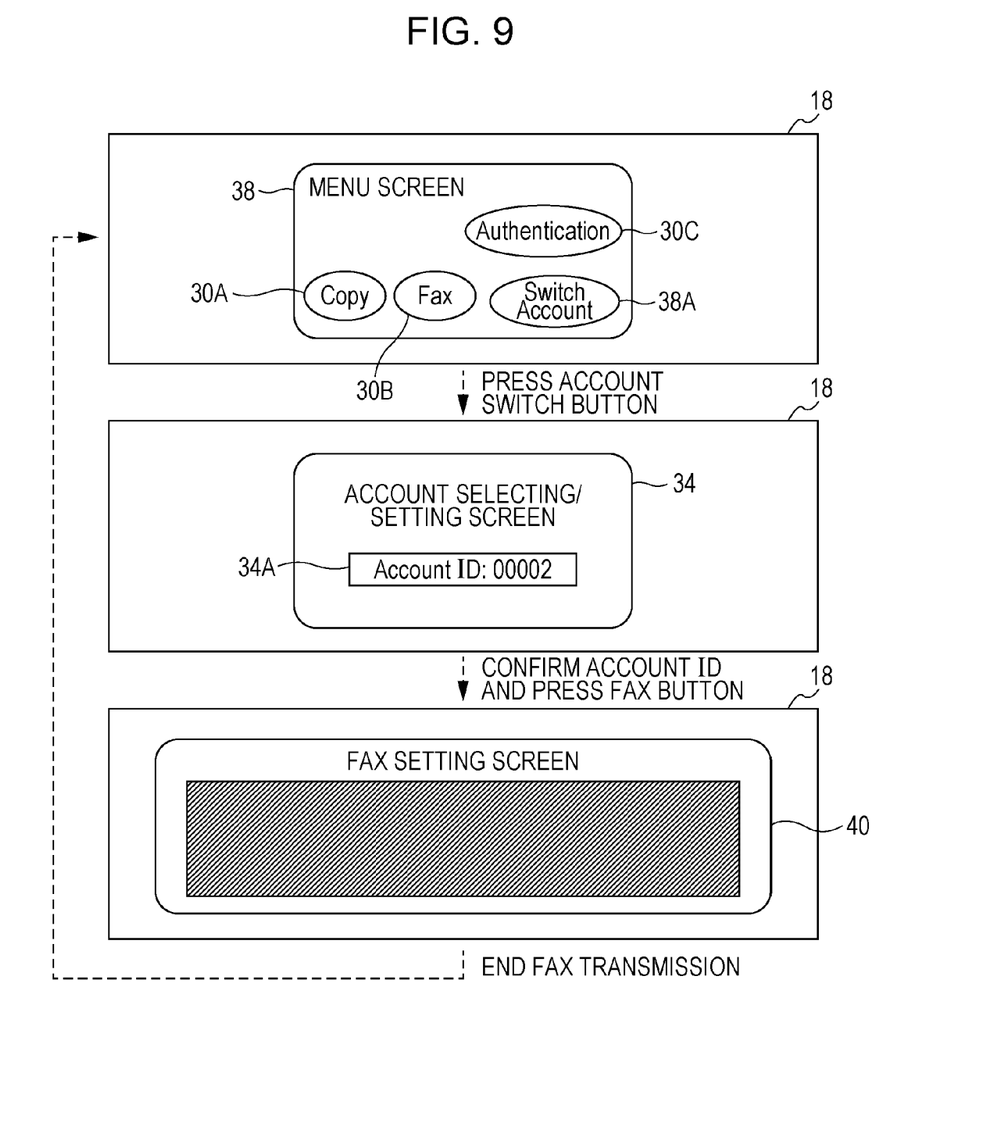
FIG. 9 is a diagram illustrating an example of a screen transition state on the UI panel when an account switch process according to the exemplary embodiment is being performed.

Referring to FIG. 8, in step 200, the account selecting/setting screen 34 is displayed on the UI panel 18 as illustrated in FIG. 9. Then, the process proceeds to step 202, where it is determined whether or not a different account ID, which is different from the account ID previously input to the account ID input field 34A and confirmed, has been input and confirmed by pressing a confirmation key (not illustrated). If a positive determination is made, the process proceeds to step 204. On the other hand, if a negative determination is made, the process proceeds to step 206.

In step 206, it is determined whether or not a condition for confirming the account ID that is currently input in the account ID input field 34A is satisfied (e.g., a condition in which the confirmation key (not illustrated) has been pressed, or a condition in which a predetermined time period (e.g., five minutes) has elapsed from when step 200 is performed). If a negative determination is made, the process returns to step 202. If a positive determination is made, the process proceeds to step 208.

In step 204, it is determined whether or not the account ID that is input and confirmed in step 202 is an account ID representing an account address that is authorized in advance as an account address, that is, whether or not the account ID that is input and confirmed in step 202 is an account ID stored in the memory 26 in association with the user ID that is input and confirmed in step 106 in FIG. 5. If a positive determination is made, the process proceeds to step 208. If a negative determination is made, the process proceeds to step 210, where an error screen is displayed on the UI panel 18. Then, the process proceeds to step 232.

In step 208, it is determined whether or not an image processing output function has been specified. When the copy button 30A or fax button 30B is pressed by the user on the account switch screen 38, a positive determination is made in step 208 and the process proceeds to step 220. Hereinafter, in order to avoid complexity, a case where the fax button 30B is pressed will be described.

On the other hand, if neither the copy button 30A nor the fax button 30B is pressed in step 208, a negative determination is made and the process proceeds to step 214. In step 214, it is determined whether or not an authentication cancel condition for canceling the current authentication state is satisfied (e.g., a condition in which a predetermined time period (five minutes) has elapsed from when step 208 is performed, or a condition in which information for providing an instruction to cancel the current authentication state has been received through operation of the UI panel 18 or the operation unit 20). If a negative determination is made, the process returns to step 208. If a positive determination is made, the process proceeds to step 218.

In step 218, the current authentication state is canceled, and the process proceeds to step 100 of the function specification execution process program.

In step 220, the screen displayed on the UI panel 18 is changed from the account selecting/setting screen 34 to the specified function screen (here, "fax setting screen 40" serving as a screen used for performing operation input for starting the fax function), which is a screen used for performing operation input for starting the image processing output function specified in step 208 (see FIG. 9), and the process proceeds to step 222. Note that the fax setting screen 40 is a screen for performing various settings before performing fax transmission, and various setting keys, a fax transmission start key for starting fax transmission, and so forth are displayed in the hatched area in FIG. 9. When an instruction to start fax transmission is provided after various settings have been performed by the user on the fax setting screen 40, fax transmission is performed in accordance with the settings. Also, accounting for the fax transmission is performed for the account address represented by the account ID that is currently set.

In step 222, it is determined whether or not an instruction to start fax transmission has been input on the fax setting screen 40. If a positive determination is made, the process proceeds to step 224. On the other hand, if a negative determination is made, the process proceeds to step 225, where it is determined whether or not a return condition for returning to the preceding screen, that is, the account selecting/setting screen 34, is satisfied (here, a condition in which a predetermined time period (five minutes) has elapsed from when step 204 is performed). If a positive determination is made, the process returns to step 200. On the other hand, if a negative determination is made, the process proceeds to step 226, where it is determined whether or not an authentication cancel condition for canceling the current authentication state is satisfied (e.g., a condition in which a predetermined time period (ten minutes) has elapsed from when step 204 is performed). If a negative determination is made, the process returns to step 222. If a positive determination is made, the process proceeds to step 218.

In step 224, the image processing output function specified in step 208 (here, the fax function) is started, and fax transmission is performed in accordance with the settings performed on the fax setting screen 40. In step 228, it is determined whether or not the fax transmission performed in step 224 has ended. If the fax transmission has ended, the process proceeds to step 230, where the usage amount management device 22 is controlled so that usage amount information representing a usage amount is stored in the storage site (storage area) represented by the account ID that is input and confirmed in step 202 (so that accounting is performed for the account address).

In step 232, the screen currently displayed on the UI panel 18 is changed to the account switch screen 38 (see FIG. 9), and then the account switch process program ends.

Figure 10:
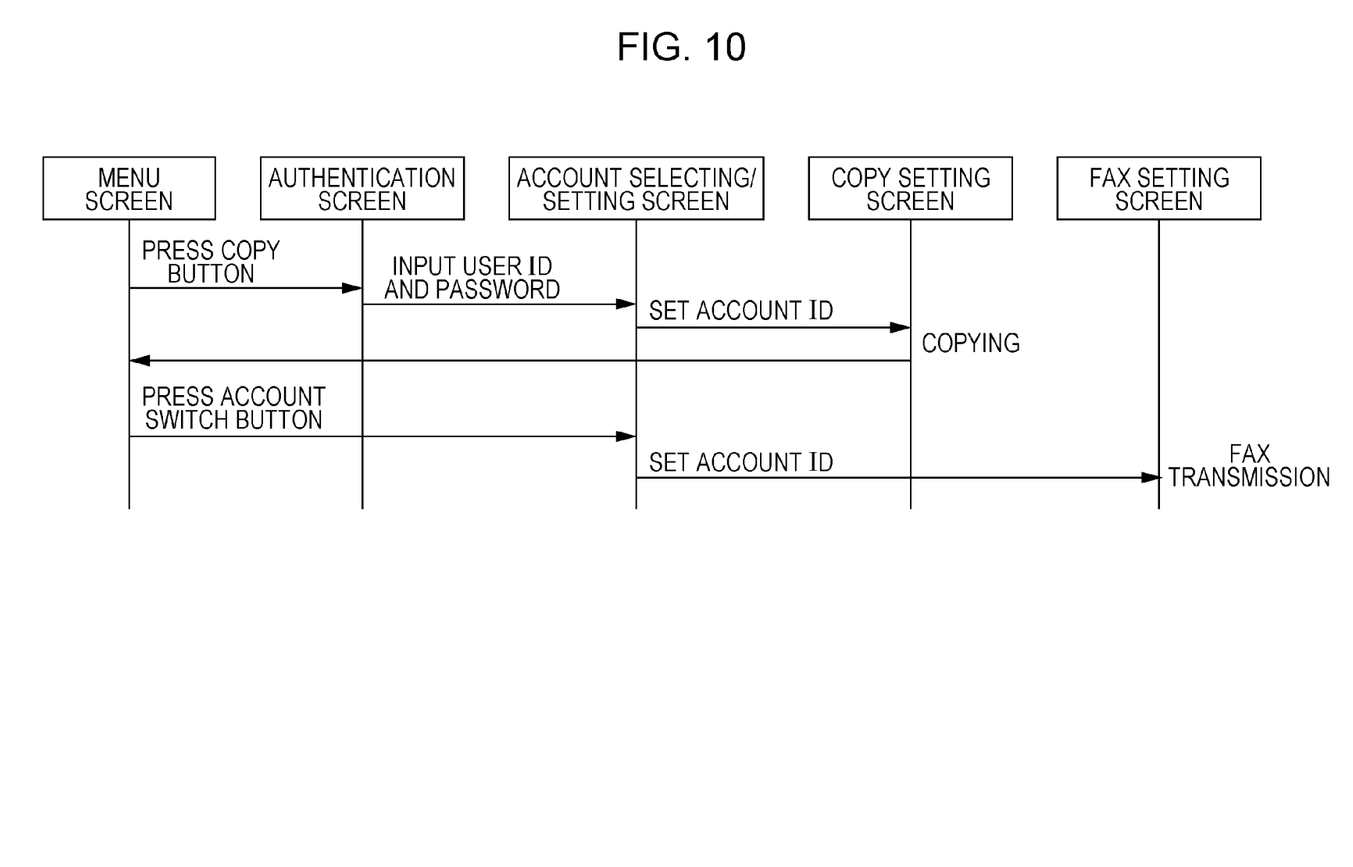
FIG. 10 is a diagram illustrating a transition state of the operation of the image processing output apparatus when the function specification execution process and the account switch process according to the exemplary embodiment are being performed.

FIG. 10 is a state transition diagram illustrating an example of the flow of the function specification execution process and the account switch process performed in the image processing output apparatus 10 according to this exemplary embodiment.

As illustrated in FIG. 10, when the copy button 30A is pressed on the menu screen 30, the screen displayed on the UI panel 18 is changed from the menu screen 30 to the authentication screen 32, on which a user ID and a password are input. If the user ID and password are of a predetermined user (a user authorized to use the image processing output apparatus 10), the screen displayed on the UI panel 18 is changed from the authentication screen 32 to the account selecting/setting screen 34, on which an account ID is set. If the set account ID is a predetermined account ID (an account ID associated with the authenticated user ID), the screen displayed on the UI panel 18 is changed from the account selecting/setting screen 34 to the copy setting screen 36. When an instruction to start the execution of copying is input after various settings have been performed on the copy setting screen 36, copying is performed in accordance with the settings. Then, copy amount information (usage amount information) representing a copy amount (usage amount) is stored in the storage area represented by the account ID that is currently set.

After copying has been performed, the screen displayed on the UI panel 18 is changed from the copy setting screen 36 to the menu screen 38. When the account switch button 38A is pressed on the account switch screen 38, the account selecting/setting screen 34 is displayed on the UI panel 18. When an account ID is set on the account selecting/setting screen 34, the screen displayed on the UI panel 18 is changed to the fax setting screen 40. When an instruction to start fax transmission is provided after various settings regarding fax transmission have been performed on the fax setting screen 40, fax transmission is performed. Then, fax transmission amount information (usage amount information) representing a fax transmission amount (usage amount) is stored in the storage area represented by the account ID that is currently set.

In the above-described exemplary embodiment, the copy button 30A or the fax button 30B is pressed to specify an image processing output function on the menu screen 30. Alternatively, the authentication button 30C may be pressed. For example, if the authentication button 30C is pressed on the menu screen 30, the screen displayed on the UI panel 18 is changed from the menu screen 30 to the authentication screen 32. After authentication of a user has been completed on the authentication screen 32, the screen changes to the menu screen 30, on which the copy button 30A or the fax button 30B is pressed to specify the image processing output function.

In the above-described exemplary embodiment, referring to FIG. 9, the screen displayed on the UI panel 18 is changed from the fax setting screen 40 to the menu screen 38 and to the account selecting/setting screen 34 after fax transmission has ended. Alternatively, the screen displayed on the UI panel 18 may be directly changed from the fax setting screen 40 to the account selecting/setting screen 34 after fax transmission has ended. In this case, the account selecting/setting screen 34 is displayed after fax transmission has ended, and thus the time before input of an account ID is shortened.

Also, in the above-described exemplary embodiment, a condition in which a predetermined time period (five minutes) has elapsed from when step 204 is performed is used as the return condition in step 225. Alternatively, another condition may be used, for example, a condition in which a predetermined time period (five minutes) has elapsed from when step 220 is performed, or a condition in which an instruction to return to the account selecting/setting screen 34 has been input via the UI panel 18 or the operation unit 20.

Also, in the above-described exemplary embodiment, a condition in which a predetermined time period (ten minutes) has elapsed from when step 204 is performed is used as the authentication cancel condition in step 226. Alternatively, another condition may be used, for example, a condition in which a predetermined time period (ten minutes) has elapsed from when the copy setting screen 36 is displayed, or a condition in which information for providing an instruction to cancel the current authentication state is received through operation of the UI panel 18 or the operation unit 20.

Also, in the above-described exemplary embodiment, the copy button 30A and the fax button 30B for specifying the copying function and the fax function are displayed on the menu screen 30. Alternatively, for example, a button for specifying another function, such as a scanner function or image formation function, may be provided.

Also, in the above-described exemplary embodiment, a target of accounting is an account address represented by an account ID, and the account ID is used for specifying the account address. Alternatively, the account ID may be used as an ID for specifying each image processing output function provided in the image processing output apparatus 10. In this case, a user is charged in accordance with a usage amount of each image processing output function. More specifically, the user specified by the user ID associated with the account ID stored in the memory 26 is charged in accordance with the usage amount of the image processing output function specified by the account ID. For example, assume that the account ID "00001" corresponds to the copying function and the account ID "00002" corresponds to the fax function. In this case, if a user is charged in accordance with the usage amount of the copying function and the usage amount of the fax function, each of the copying function and the fax function is handled as a target of charging.

Also, in the above-described exemplary embodiment, a user is allowed to select an account ID after authentication of the user has been completed. Alternatively, a user may be allowed to select an account ID first, and then authentication of the user may be performed by allowing the user to input the user ID and password.

Also, in the above-described exemplary embodiment, the screen displayed on the UI panel 18 is changed from the specified function screen (the fax setting screen 40 in the exemplary embodiment) to the menu screen 38, thereby giving a notification that input and confirmation of a new account ID is permitted without invalidating the user ID and password that are currently set. Also, the screen displayed on the UI panel 18 is changed from the specified function screen (the fax setting screen 40 in the exemplary embodiment) to the menu screen 30, thereby giving a notification that the currently set user ID and password have been invalidated. Alternatively, a notification may be given using an audible message output from an audio playback apparatus (e.g., speaker) or permanent visual display in an image forming apparatus (e.g., printer). Also, visual display on the UI panel 18, an audible message output from the audio playback apparatus, and permanent visual display in the image forming apparatus may be combined together to give a notification. Furthermore, information may be transmitted to the terminal apparatus 28 via the network interface 24, and the information may be output from an output device (speaker, printer, display, or the like) connected to the terminal apparatus 28, thereby giving a notification.

Also, in the above-described exemplary embodiment, the account selecting/setting screen 34 is displayed on the UI panel 18 by pressing the account switch button 38A, and then a user is allowed to input and confirm an account ID. Alternatively, in the above-described function specification execution process program, a process of displaying a composite screen in which the account selecting/setting screen 34 and the menu screen 38 are arranged on the UI panel 18 may be performed instead of step 132 after step 130. In this way, if a predetermined condition is satisfied, a composite screen including the account selecting/setting screen 34 and the menu screen 38 may be displayed, the account selecting/setting screen 34 may be displayed alone, or a composite screen including the account selecting/setting screen 34 and another screen may be displayed, thereby allowing a user to input and confirm an account ID.

Figure 11:
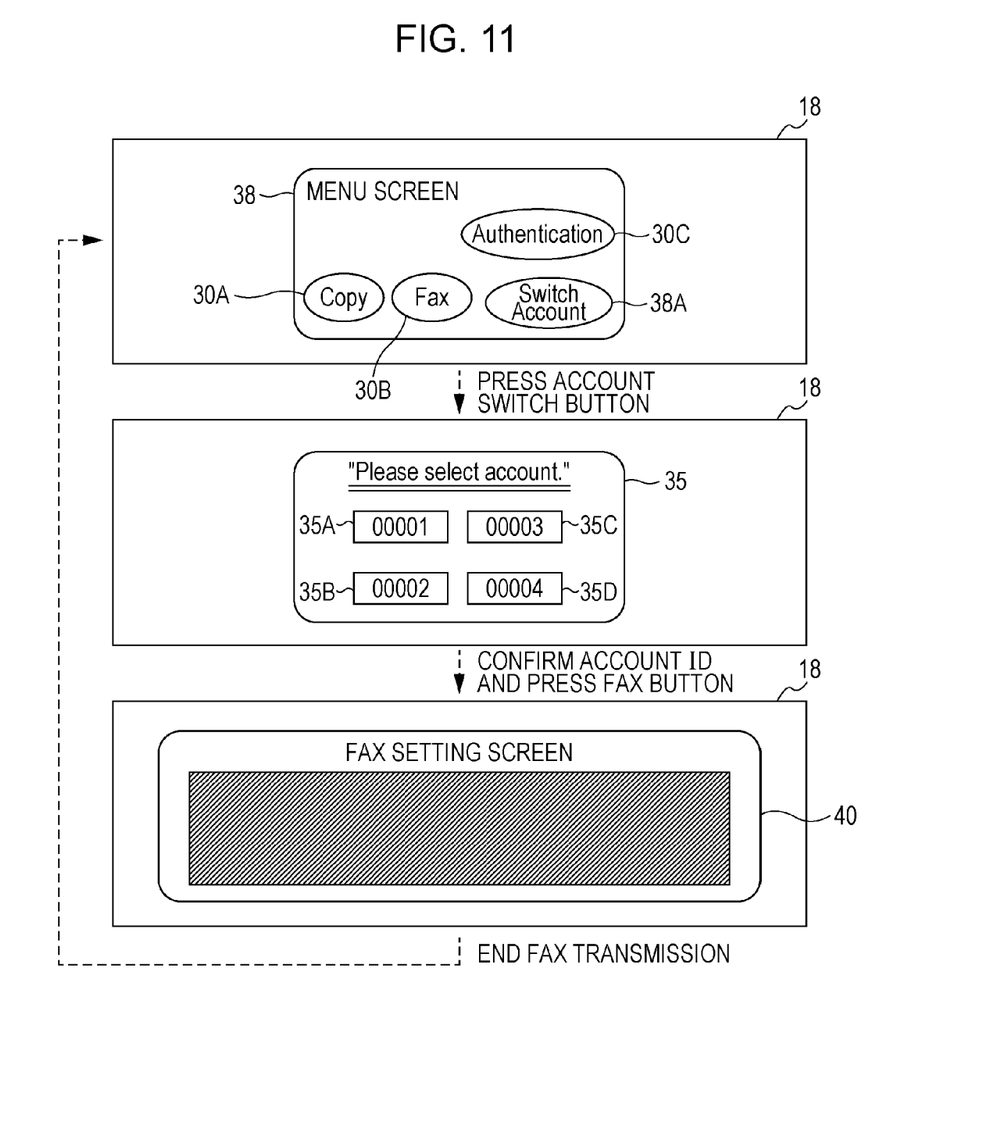
FIG. 11 is a diagram illustrating a modification of the screen transition state on the UI panel according to the exemplary embodiment.

Also, in the above-described exemplary embodiment, a user is allowed to input an account ID to the account ID input field 34A on the account selecting/setting screen 34. Alternatively, for example, in a case where the account IDs "00001", "00002", "00003", and "00004" are assigned to the user who are currently in a login state, the following operation may be performed. That is, as illustrated in FIG. 11, an account selecting/setting screen 35 having account ID buttons 35A to 35D corresponding to the account IDs "00001", "00002", "00003", and "00004", and a message "Please select an account." for inducing the user to input an account ID may be displayed, and the user may be allowed to press any of the account ID buttons 35A to 35D to select an account ID.

Also, in the above-described exemplary embodiment, the function specification execution process program and the account switch process program are stored in advance in the ROM. Alternatively, these programs may be provided in the state of being stored in a computer readable recording medium, such as a compact disc read only memory (CD-ROM), a digital versatile disc read only memory (DVD-ROM), or a universal serial bus (USB) memory. Alternatively, these programs may be distributed via a wired or wireless communication medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an accepting unit that accepts an identifier for identifying a user of a device and a storage site information item representing a storage site for storing a usage amount information item representing a usage amount concerning use of the device by the user;
   a memory that stores one or more identifiers and a plurality of storage site information items in association with each other;
   a controller that performs, if the identifier accepted by the accepting unit matches one of the identifiers stored in the memory and if the storage site information item accepted by the accepting unit matches one of the storage site information items stored in the memory, control so that the usage amount information item representing the usage amount concerning use of the device is stored in the storage site represented by the storage site information item; and
   a switch unit that switches, if a different storage site information item that is different from the storage site information item currently accepted by the accepting unit among the storage site information items stored in the memory is accepted by the accepting unit when the storage site represented by the storage site information item accepted by the accepting unit is set, in accordance with control performed by the controller, as a target in which the usage amount information item is to be stored, the storage site set as the target to the storage site represented by the different storage site information item.

2. The information processing apparatus according to claim 1, further comprising:
   a switch instruction accepting unit that accepts a switch instruction for switching a storage site by the switch unit,
   wherein a condition for accepting the different storage site information item by the accepting unit is accepting the switch instruction by the switch instruction accepting unit when the storage site represented by the storage site information item accepted by the accepting unit is set, by the controller, as a target in which the usage amount information item is to be stored.

3. The information processing apparatus according to claim 1, further comprising:
   a permission unit that permits, after a predetermined first time period has elapsed without the device being used from when the storage site represented by the storage site information item accepted by the accepting unit is set, by the controller, as the target in which the usage amount information item is to be stored, acceptance of a new storage site information item by the accepting unit without invalidating the identifier that is currently accepted by the accepting unit; and
   an invalidation unit that invalidates the identifier that is currently accepted by the accepting unit after a predetermined second time period has elapsed without the new storage site information item being accepted from when the permission unit permits acceptance of the new storage site information item.

4. The information processing apparatus according to claim 2, further comprising:
   a permission unit that permits, after a predetermined first time period has elapsed without the device being used from when the storage site represented by the storage site information item accepted by the accepting unit is set, by the controller, as the target in which the usage amount information item is to be stored, acceptance of a new storage site information item by the accepting unit without invalidating the identifier that is currently accepted by the accepting unit; and
   an invalidation unit that invalidates the identifier that is currently accepted by the accepting unit after a predetermined second time period has elapsed without the new storage site information item being accepted from when the permission unit permits acceptance of the new storage site information item.

5. The information processing apparatus according to claim 3, further comprising:
a notification unit that gives a notification that acceptance of the new storage site information item has been permitted if acceptance of the new storage site information item has been permitted by the permission unit, and that gives a notification that the identifier has been invalidated if the identifier has been invalidated by the invalidation unit.

6. The information processing apparatus according to claim 4, further comprising:
a notification unit that gives a notification that acceptance of the new storage site information item has been permitted if acceptance of the new storage site information item has been permitted by the permission unit, and that gives a notification that the identifier has been invalidated if the identifier has been invalidated by the invalidation unit.

7. The information processing apparatus according to claim 1, further comprising:
an authentication unit that accepts an authentication information item corresponding to the identifier and that permits use of the device on the basis of the accepted authentication information item,
wherein, if the accepting unit accepts a storage site information item in a state where use of the device is permitted by the authentication unit, the controller allows the switch unit to perform switching without invalidating the state where use of the device is permitted by the authentication unit and without requesting any authentication.

8. The information processing apparatus according to claim 1, further comprising:
an authentication unit that accepts an authentication information item corresponding to the identifier and that permits use of the device on the basis of the accepted authentication information item,
wherein, if the accepting unit accepts a storage site information item in a state where use of the device is permitted by the authentication unit, the controller allows the switch unit to perform switching without invalidating the state where use of the device is permitted by the authentication unit and without requesting any authentication, and
wherein, if the accepting unit accepts a storage site information item in a state where use of the device is not permitted by the authentication unit, the controller allows the switch unit to perform switching after authentication has been performed by the authentication unit.

9. An information processing system comprising:
the information processing apparatus according to claim 1;
a transmission unit that transmits a usage amount information item stored in a storage site; and
a reception unit that receives the usage amount information item transmitted by the transmission unit.

10. A non-transitory computer readable medium storing a program causing a computer to execute a process, the process comprising:
accepting an identifier for identifying a user of a device and a storage site information item representing a storage site for storing a usage amount information item representing a usage amount concerning use of the device by the user;
performing, if the identifier accepted in the accepting matches one of one or more identifiers stored in a memory and if the storage site information item accepted in the accepting matches one of a plurality of storage site information items stored in the memory in association with the identifiers, control so that the usage amount information item representing the usage amount concerning use of the device is stored in the storage site represented by the storage site information item; and
switching, if a different storage site information item that is different from the storage site information item currently accepted in the accepting among the storage site information items stored in the memory is accepted when the storage site represented by the storage site information item accepted in the accepting is set, in accordance with control performed in the performing, as a target in which the usage amount information item is to be stored, the storage site set as the target to the storage site represented by the different storage site information item.

\* \* \* \* \*